(12) United States Patent
Che et al.

(10) Patent No.: US 9,483,316 B2
(45) Date of Patent: Nov. 1, 2016

(54) MANAGING A VIRTUAL MACHINE INSTANCE

(71) Applicant: International Business Machines Corporation, Armonk, NY (US)

(72) Inventors: Yang Che, Beijing (CN); Xue X. Cui, Beijing (CN); Zhao Liu, Beijing (CN); Tan Jiang, Beijing (CN); Liang Wang, Beijing (CN); Xi Ning Wang, Beijing (CN); Yong Yao, Beijing (CN); Xuan X. Zhang, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/723,865

(22) Filed: May 28, 2015

(65) Prior Publication Data

US 2015/0347194 A1 Dec. 3, 2015

(30) Foreign Application Priority Data

May 29, 2014 (CN) .......................... 2014 1 0236341

(51) Int. Cl.
  *G06F 9/455* (2006.01)
  *G06F 9/50* (2006.01)
(52) U.S. Cl.
  CPC ......... *G06F 9/5077* (2013.01); *G06F 9/45558* (2013.01); *G06F 2009/4557* (2013.01)
(58) Field of Classification Search
  CPC .................................................... G06F 9/5077
  USPC .................................................... 718/1–108
  See application file for complete search history.

(56) References Cited

U.S. PATENT DOCUMENTS 7,103,874 B2 * 9/2006 McCollum ................ G06F 8/36
                                                          709/220
7,114,064 B2 * 9/2006 Ramesh ................ G06F 9/4411
                                                          713/1

(Continued)

FOREIGN PATENT DOCUMENTS

CN  103106098 A  5/2013
GB    2494495 A  3/2013

(Continued)

OTHER PUBLICATIONS

Garfinkel, Tal, et al. "Terra: A virtual machine-based platform for trusted computing." ACM SIGOPS Operating Systems Review. vol. 37. No. 5. ACM, 2003. pp. 194-206.*

(Continued)

*Primary Examiner* — Satish Rampuria
(74) *Attorney, Agent, or Firm* — Francis Lammes; Stephen J. Walder, Jr.; Richard A. Wilhelm

(57) ABSTRACT

The present invention relates to mechanisms for managing VM instances. More specifically, the mechanisms provide at least one VM instance in a resource pool. A configuration requirement is provided with respect to a virtual machine, the configuration requirement describing a first amount of application resources to be installed on the virtual machine. Based on the configuration requirement, a resource tree is built describing a dependency relation between the first amount of application resources. At least one VM instance corresponding to a sub-path of the resource tree is provided in the resource pool, where on each VM instance in the at least one VM instance there are installed application resources included in the sub-path.

20 Claims, 11 Drawing Sheets

(56) References Cited

U.S. PATENT DOCUMENTS

| | | | |
|---|---|---|---|
| 7,165,239 B2* | 1/2007 | Hejlsberg | G06F 9/4428 717/114 |
| 7,827,557 B2* | 11/2010 | Zhu | G06F 9/5005 370/238 |
| 7,861,247 B1* | 12/2010 | Santos | G06F 9/5011 700/28 |
| 7,865,582 B2* | 1/2011 | Santos | G06F 9/5005 709/201 |
| 8,065,676 B1 | 11/2011 | Sahai et al. | |
| 9,246,840 B2* | 1/2016 | Anderson | H04L 47/70 |
| 2007/0294668 A1* | 12/2007 | Mohindra | G06F 8/36 717/120 |
| 2008/0263553 A1 | 10/2008 | Lueck et al. | |
| 2012/0191929 A1 | 7/2012 | Zietzke et al. | |
| 2013/0055239 A1 | 2/2013 | Anderson et al. | |
| 2013/0097601 A1* | 4/2013 | Podvratnik | G06F 9/5027 718/1 |
| 2013/0139152 A1 | 5/2013 | Chang et al. | |

FOREIGN PATENT DOCUMENTS

| | | |
|---|---|---|
| WO | WO2012/118849 A1 | 9/2012 |
| WO | WO2013/106257 A1 | 7/2013 |

OTHER PUBLICATIONS

Bullers Jr, William I., Stephen Burd, and Alessandro F. Seazzu. "Virtual machines-an idea whose time has returned: application to network, security, and database courses." ACM SIGCSE Bulletin. vol. 38. No. 1. ACM, 2006. pp. 102-106.*

Wickremasinghe, Bhathiya, Rodrigo N. Calheiros, and Rajkumar Buyya. "Cloudanalyst: A cloudsim-based visual modeller for analysing cloud computing environments and applications." Advanced Information Networking and Applications (AINA), 2010 24th IEEE International Conference on. IEEE, 2010. pp. 446-452.*

"System and method to create profile-aware virtual machine pool in cloud environment", www.ip.com, IPCOM000227780, May 16, 2013, 13 pages.

Huang, Feng et al., "Efficient Virtual Machine Deployment in Large Scale Resource Environment", 2010 IEEE 16th International Conference on Parallel and Distributed Systems (ICPADS), Dec. 8-10, 2010, pp. 752-757.

Liao, Chun-Hao et al., "A Novel Mechanism for Rapid Provisioning Virtual Machines of Cloud Services", 2012 IEEE Network Operations and Management Symposium (NOMS), Apr. 16-20, 2012, pp. 721-735.

* cited by examiner

MANAGING A VIRTUAL MACHINE INSTANCE

BACKGROUND

Various embodiments of the present invention relate to virtual machines (VMs), and more specifically, to a method and apparatus for managing a VM instance.

With the development of computer hardware/software technologies and network technology, virtual machines (VMs) are widely applied to various respects of people's work and life. By means of virtual machines, users no more have to purchase high-performance computer devices and expensive application resources (such as operating systems, middleware, middleware configurations, databases, applications, etc.), do not have to install and test computer devices, and do not have to engage technical professionals to install various needed application resources.

The user may request a virtual machine to a VM provider and specify resources, such as computing resources, storage resources and application resources, should be installed on the virtual machine. Subsequently, the VM provider may allocate specific computing resources and storage resources from a resource pool and install needed application resources one after another according to configuration requirements the user specifies.

Like the process of installing application resources on a physical machine, the VM provider also needs to install various application resources one after another, and since those application resources might contain a dependency relation between them, the VM provider should serially install those application resources one after another in an order of the dependency relation. As the installation process involves a couple of configurations, the installation process of each application resource costs a certain amount of time, and as a whole it takes a long time to generate a VM instance.

In order to reduce the wait time for users, there have been proposed technical solutions for provisioning in the resource pool VM instances that satisfy simple demands. However, these VM instances only have the most basic configurations, e.g., have a specific amount of CPU resources, memory resources and operating systems, which basic configurations do not satisfy ever-increasing special needs of massive users.

With the further complication of user needs, even if a VM instance having basic configurations has been obtained from the resource pool, it takes a long time to install on the VM instance various application resources that are specified by the user. At this point, how to manage the resource pool in a more efficient way now becomes a focus of attention.

SUMMARY

Therefore, it is desired to develop a technical solution capable of effectively managing VM instances in a resource pool, and it is desired the technical solution can provide a certain amount of VM instances in a resource pool in advance during normal running, so that when receiving a user request VM instances provided in advance may be allocated to the user quickly so as to reduce the wait time for users and increase the quality of service. On the other hand, it is desired the technical solution can be compatible with the existing technical solution, so as to provide higher response efficiency without changing the existing technical solution as far as possible.

In one embodiment of the present invention, there is proposed a method for providing at least one VM instance in a resource pool, comprising: parsing a configuration requirement with respect to a virtual machine, the configuration requirement describing a first amount of application resources to be installed on the virtual machine; building, on the basis of the configuration requirement, a resource tree describing a dependency relation between the first amount of application resources; providing in the resource pool at least one VM instance corresponding to a sub-path of the resource tree, wherein on each VM instance in the at least one VM instance there are installed application resources included in the sub-path.

In one embodiment of the present invention, there is proposed an apparatus for providing at least one VM instance in a resource pool, comprising: a processor; and a memory coupled to the processor, wherein the memory comprises instructions which, when executed by the processor, cause the processor to: parse a configuration requirement with respect to a virtual machine, the configuration requirement describing a first amount of application resources to be installed on the virtual machine; build, on the basis of the configuration requirement, a resource tree describing a dependency relation between the first amount of application resources; provide in the resource pool at least one VM instance corresponding to a sub-path of the resource tree, wherein on each VM instance in the at least one VM instance there are installed application resources included in the sub-path.

In one embodiment of the present invention, there is proposed a computer program product comprising a computer readable storage medium having a computer readable program for providing at least one virtual machine instance in a resource pool stored therein, wherein the computer readable program, when executed on a computing device, causes the computing device to: parse a configuration requirement with respect to a virtual machine, the configuration requirement describing a first amount of application resources to be installed on the virtual machine; build, on the basis of the configuration requirement, a resource tree describing a dependency relation between the first amount of application resources; and provide in the resource pool at least one virtual machine instance corresponding to a sub-path of the resource tree, wherein on each virtual machine instance in the at least one virtual machine instance there are installed application resources included in the sub-path.

By means of the method, apparatus, and computer program product of the present invention, a certain number of VM instances may be provided in the resource pool in advance, and a desired VM instance provided directly or by a simple installation process when receiving a user request.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
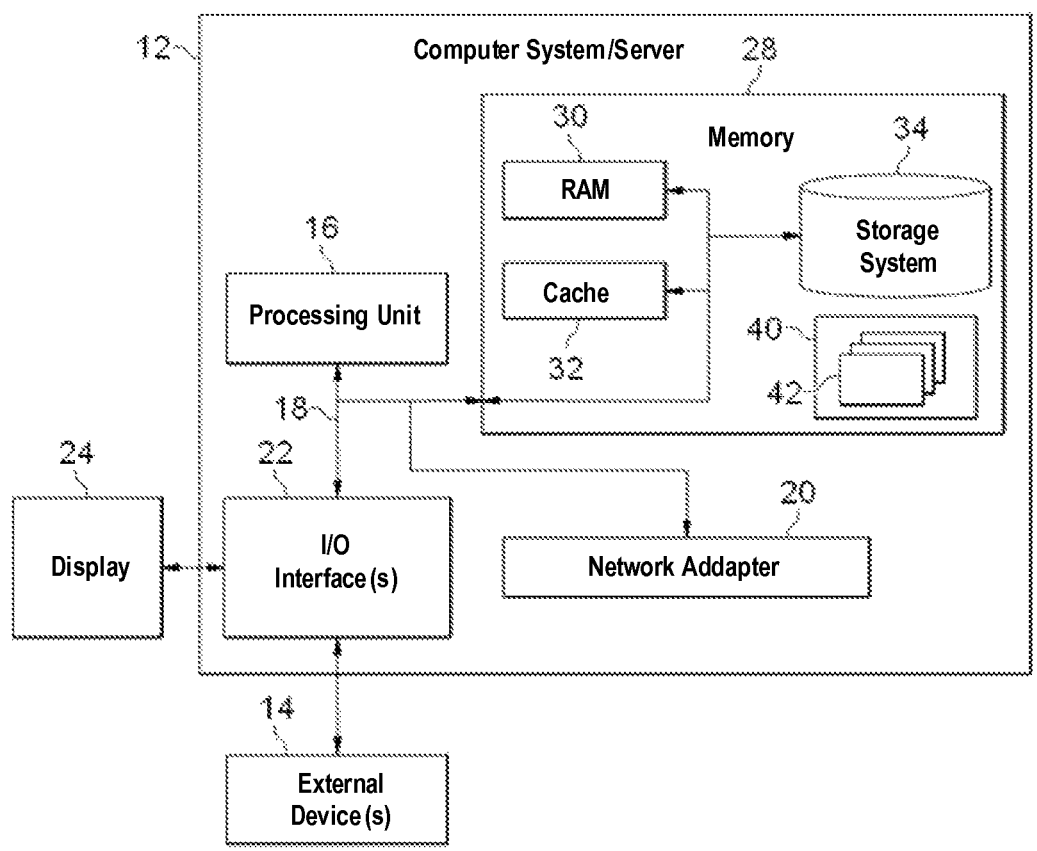
FIG. 1 schematically depicts an exemplary computer system/server which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
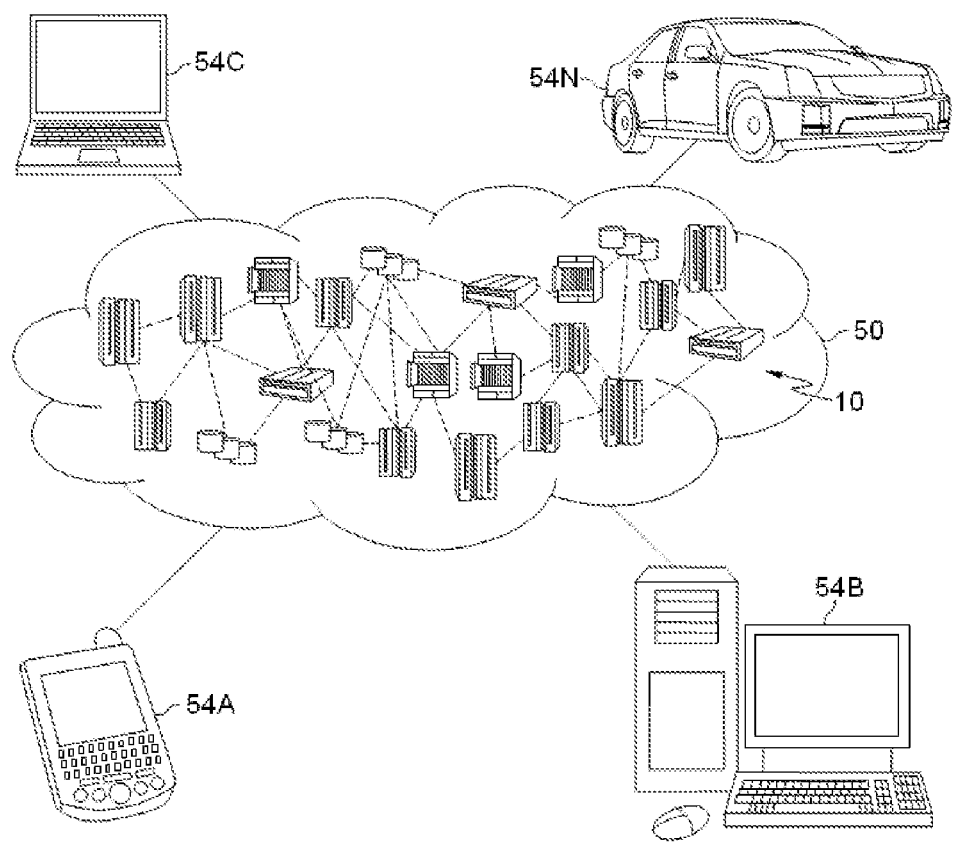
FIG. 2 schematically depicts an exemplary cloud computing environment.

Referring now to FIG. 2, illustrative cloud computing environment 50 is depicted. As shown, cloud computing environment 50 comprises one or more cloud computing nodes 10 with which local computing devices used by cloud consumers may communicate. The local computing devices may be, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
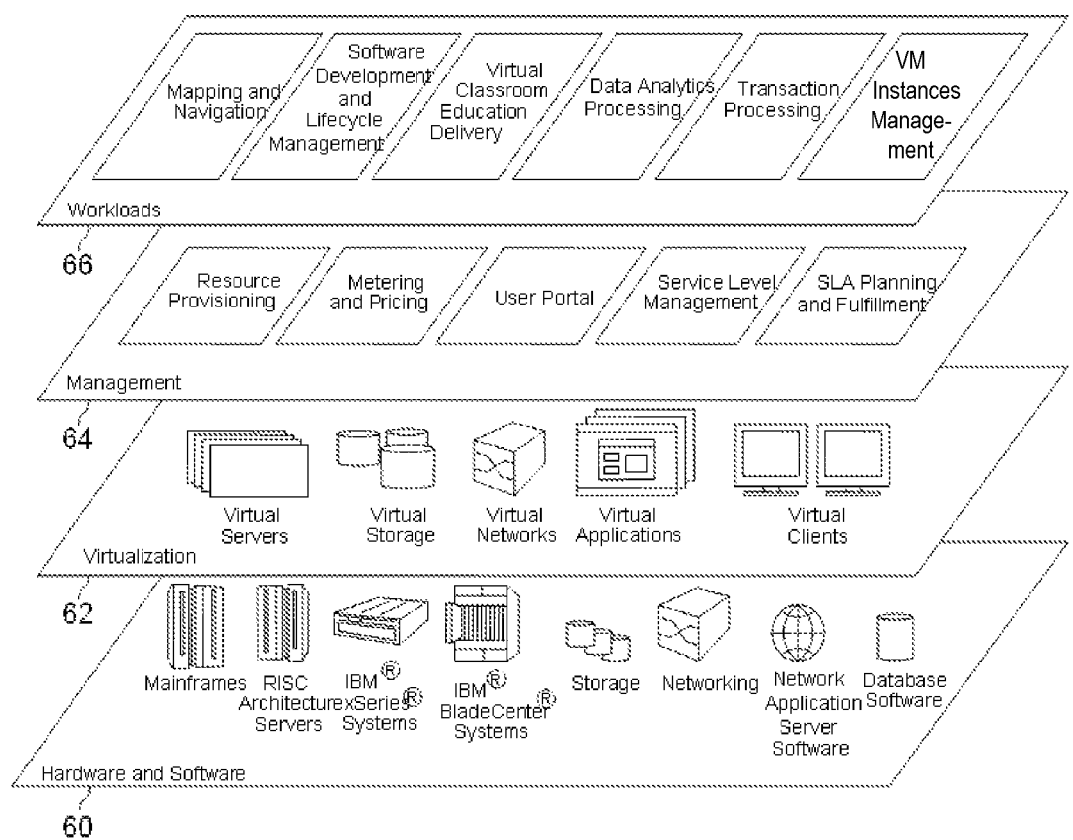
FIG. 3 schematically depicts abstraction model layers provided the could computing environment (FIG. 2)

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes (e.g. IBM® zSeries® systems); RISC (Reduced Instruction Set Computer) architecture based servers (e.g., IBM pSeries® systems); IBM xSeries® systems; IBM BladeCenter® systems; storage devices; networks and networking components. Examples of software components include network application server software (e.g., IBM WebSphere® application server software); and database software (e.g, IBM DB2® database software). (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and VM instance management.

In one embodiment of the present invention, the technical solution for managing VM instances according to various embodiments of the present invention may be implemented at workloads layer 66, so that the VM instance management can be conveniently implemented in the cloud computing environment and further the VM provider's response time to user requests may be reduced. An application environment of the present invention has been illustrated above, whereas those skilled in the art should understand various embodiments of the present invention may further be implemented in any other type of computing environment that is currently known or to be developed later.

Figure 4:
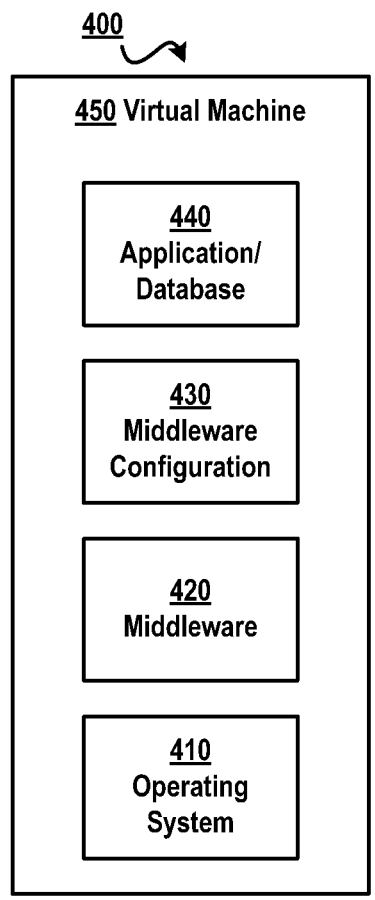
FIG. 4 schematically depicts a block diagram of a dependency relation between various application resources in a virtual machine.

FIG. 4 schematically shows a block diagram 400 of a dependency relation between various application resources in a virtual machine. Like the process of installing application resources on a traditional physical machine, in a virtual environment various application resources also need to be installed one after another according to a dependency relation between those application resources. For example, in a virtual machine 450 as shown in FIG. 4, an operating system 410 is the most underlying application resource which does not depend on other application resources and thus can be directly installed on virtual machine 450. Above operating system 410 there may further exist middleware 420 and middleware configuration 430 for providing additional support on the basis of operating system 410. Application/database 440 may be top application resources which are installed only after the specific operating system, middleware and middleware configuration are installed.

Therefore, when generating a VM instance, various application resources are installed one after another according to the dependency relation as shown in FIG. 4. When the user requests to install a large amount of application resources and/or wants to install complex application resources, he/she, after submitting an application, has to wait for dozens of minutes or even longer before obtaining the VM instance.

With the complication of user needs, the amount of application resources to be installed also increases, and a dependency relation between various application resources gets more and more complicated. Generally speaking, there may exist a dependency relation as below: the middleware is installed only after the operating system is installed, the middleware configuration is executed only after the middleware is installed, the application/database is installed only after the middleware configuration is executed, etc. Tables 1-4 below schematically show examples of the operating system, the middleware, the middleware configuration and the application/database, respectively.

TABLE 1

Example of Operating System

| No. | Name | Abbreviation |
|---|---|---|
| 1 | Red Hat Enterprise Linux 64 bit for Intel | RHEL64 |
| 2 | Advanced Interactive eXecutive 7.1 | AIX71 |
| 3 | Red Hat Enterprise Linux 64 bit for z system | RHEL64z |
| ... | ... | ... |

TABLE 2

Example of Middleware

| No. | Name |
|---|---|
| 1 | WebSphere Application Server 8.5 |
| 2 | WebSphere Application Server 7.0 |
| 3 | Liberty |
| 4 | DB2 10 |
| 5 | MySQL |
| ... | ... |

TABLE 3

Example of Middleware Configuration

| No. | Name |
| --- | --- |
| 1 | WebSphere Application Server-Single Server |
| 2 | WebSphere Application Server-Deployment Manager |
| 3 | WebSphere Application Server-Custom Node |
| 4 | Liberty Server |
| 5 | DB2 Instance |
| 6 | MySQL instance |
| ... | ... |

TABLE 4

Example of Application/Database

| No. | Name |
| --- | --- |
| 1 | Mini store application (Small-size app, No DB required) |
| 2 | DayTrader application (Middle-size app) |
| 3 | ERP application (Large-size app) |
| 4 | DayTrader DB and data population (Middle-size database) |
| 5 | ERP DB and data population (Large-size database) |
| ... | ... |

As shown in Tables 1-4 above, there are various levels of application resources, and there exist complicated dependency relations between these application resources. The application resources in Tables 1-4 are exemplary only, and there may exist hundreds of and even more application resources. Thereby, it is impossible to combine various application resources and provide corresponding VM instances. In addition, since it is impossible to predict which type of VM instance might be needed in future, VM instances that could be requested in future cannot be provided in the resource pool in advance.

Although existing technical solutions can provide "bare" VM instances in the resource pool or install VM instances of some underlying operating systems, this still does not satisfy user needs. At present application resources requested by a user are installed one by one only when receiving a request from the user. Therefore, the user has to spend a large quantity of time on waiting for installation.

Figure 5:
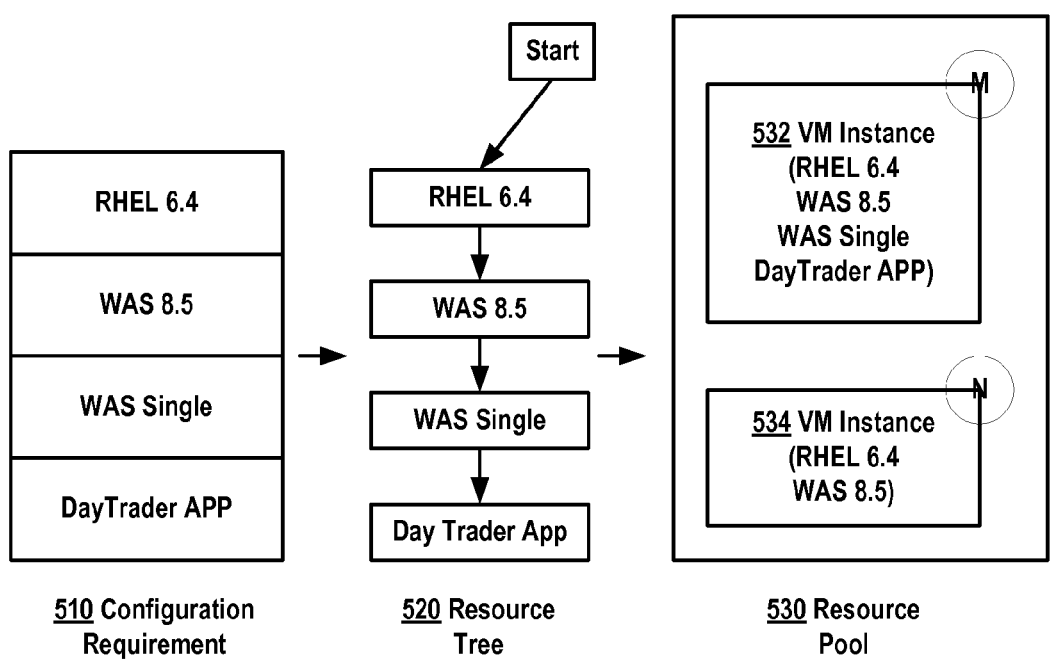
FIG. 5 schematically depicts an architecture diagram of a technical solution for providing at least one VM instance in a resource pool according to one embodiment of the present invention.

In view of various drawbacks in the prior art, the present invention proposes a technical solution for providing at least one VM instance in a resource pool on the basis of configuration requirements of a user. As shown in FIG. 5, this figure schematically shows a block diagram 500 of a technical solution for providing at least one VM instance in a resource pool according to one embodiment of the present invention. Configuration requirements 510 schematically show configuration requirements of a user. As shown in FIG. 5, the user wants to install RHEL 6.4, WAS 8.5, WAS Single and DayTrader App on a requested virtual machine. On the basis of dependency relations between these application resources, a resource tree 520 may be built by parsing configuration requirements 510. Resource tree 520 shows various application resources that are installed one by one according to a path shown by arrows from a root node "Start."

Subsequently, on the basis of sub-paths in resource tree 520, VM instances where application resources included in the sub-paths are installed may be provided in the resource pool 530. Specifically, regarding a sub-path "Start->RHEL 6.4->WAS 8.5->WAS Single->DayTraderApp," for example, VM instances 532 including various application resources along this sub-path may be provided (e.g., M VM instances may be provided). For another example, regarding a sub-path "Start->RHEL 6.4->WAS 8.5," VM instances 534 including various application resources along this sub-path may be provided (e.g., N VM instances may be provided). In this way, VM instances may be provided pertinently in view of the user's historical needs.

Note throughout the context of the present invention, the sub-path refers to a sub-path starting from the root node in the resource tree; the sub-path may start from the root node and ends at a leaf node, or starts from the root node and ends at a non-leaf node. In resource tree 520 as shown in FIG. 5, sub-paths may include: "Start->RHEL 6.4->WAS 8.5->WAS Single->DayTraderApp," "Start->RHEL 6.4->WAS 8.5," etc.

In one embodiment of the present invention, there is provided a method for providing at least one VM instance in a resource pool, comprising: parsing a configuration requirement with respect to a virtual machine, the configuration requirement describing a first amount of application resources to be installed on the virtual machine; building, on the basis of the configuration requirement, a resource tree describing a dependency relation between the first amount of application resources; providing in the resource pool at least one VM instance corresponding to a sub-path of the resource tree, wherein on each VM instance in the at least one VM instance there are installed application resources included in the sub-path.

In one embodiment of the present invention, the first amount of application resources may include one or more application resources. When there exists only one application resource, the application resource does not depend on other application resource, so the resource tree may only comprise nodes associated with the resource. When there exists a plurality of application resources, the resource tree may describe application relations between the plurality of application resources.

Figure 6A:
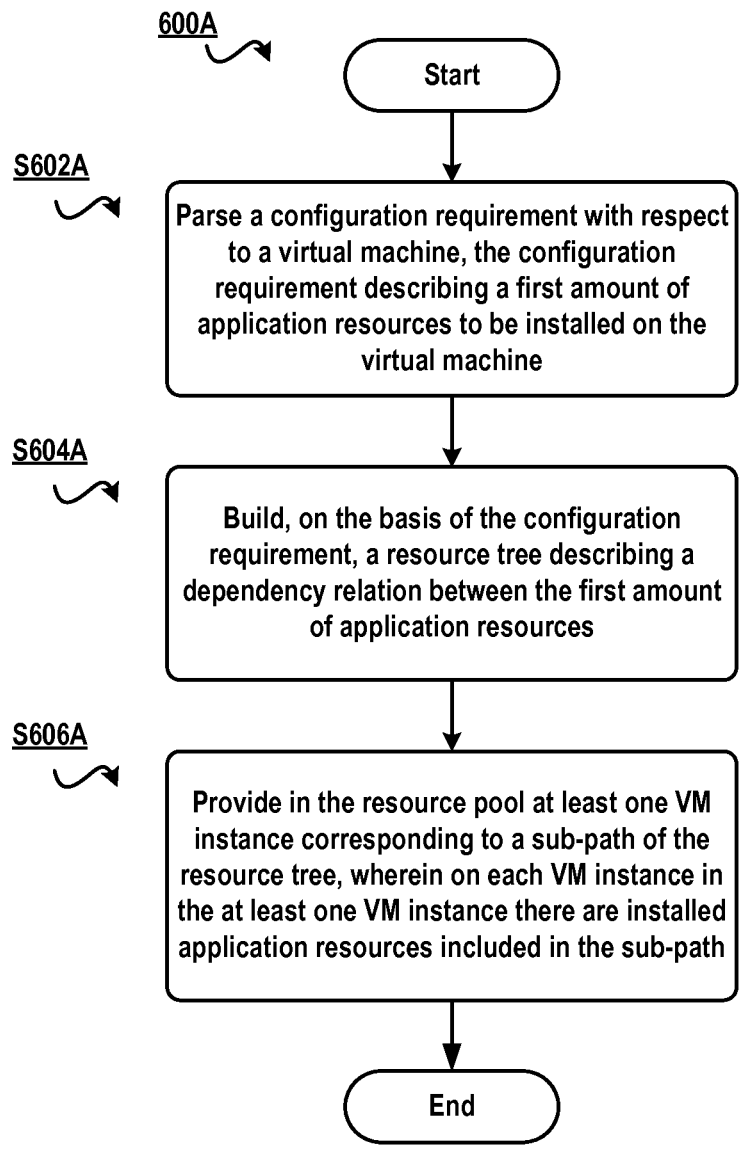
FIG. 6A schematically depicts a flowchart of a method for providing at least one VM instance in a resource pool according to one embodiment of the present invention, and FIG. 6B schematically depicts a flowchart of a method for providing a VM instance according to one embodiment of the present invention.

Specifically, FIG. 6A schematically shows a flowchart 600A of a method for providing at least one VM instance in a resource pool according to one embodiment of the present invention. As shown in this figure, in step S602A, a configuration requirement with respect to a virtual machine is parsed, the configuration requirement describing a first amount of application resources to be installed on the virtual machine. The configuration requirement may be presented in various formats. For example, as shown in FIG. 5, configuration requirement 510 may be represented in graph form; for example, the configuration requirement may be represented in text form (RHEL 6.4->WAS 8.5->WAS Single->DayTraderApp); for example, the configuration requirement may be represented in XML form; or even the configuration requirement may be described in a natural language. When the configuration requirement is represented in a different form, it may be parsed on the basis of a corresponding algorithm, and further dependency relations between the plurality of application resources are obtained. Those skilled in the art may implement this according to concrete application environment demands, which is not detailed here.

In step S604A, a resource tree describing a dependency relation between the first amount of application resources is built on the basis of the configuration requirement. The dependency relation refers to an order which is followed when installing various application resources, and the present invention does not limit how the dependency relation is obtained. For example, the dependency relation may be obtained from an additional configuration file, or the dependency relation may directly be obtained from the configuration requirement where it is included in the configuration requirement. Where the dependency relation is obtained, it may be described in a tree structure. For example, resource tree 520 in FIG. 5 shows one example of the resource tree, wherein the dependency relation may be represented in arrows. For example, an arrow between nodes RHEL 6.4 and WAS 8.5 may represent the installation of WAS 8.5 depends on RHEL 6.4, i.e., WAS 8.5 is installed only after RHEL 6.4 is installed.

In step S606A, at least one VM instance corresponding to a sub-path of the resource tree is provided in the resource pool, wherein on each VM instance in the at least one VM instance there are installed application resources included in the sub-path. For example, it is possible to provide at least one VM instance with respect to each path of the resource tree or with respect to only one part of sub-paths of the resource tree. In the example as shown in FIG. 5, M VM instances 532 and N VM instances 534 may be provided, and no VM instance is provided with respect to other sub-paths.

According to various embodiments of the present invention, not only instances of a virtual machine that has been requested previously are provided, but also instances of a virtual machine that has not been requested previously but might be requested later may be provided by providing at least one VM instance corresponding to a sub-path of the resource tree. For example, a VM instance (on which RHEL 6.4 and WAS 8.5 are installed) as shown by VM instance 534 in FIG. 5 may be provided. When the user requests a virtual machine where RHEL 6.4 and WAS 8.5 are installed, VM instance 534 in the resource pool may be directly returned to the user. When the user requests a virtual machine where WAS Deployment Manager is installed on the basis of WAS 8.5, only WAS Deployment Manager needs to be installed on VM instance 534 but various application resources do not have to be installed from the beginning.

Since the user need history can reflect future user needs to some extent and helps to predict VM instances that might be requested in future, by means of the technical solution of the present invention, the wait time for users may be shortened greatly and the operating efficiency of the virtual environment enhanced further.

In one embodiment of the present invention, the configuration requirement describes a hardware resource need of the virtual machine, and the providing in the resource pool at least one VM instance corresponding to a sub-path of the resource tree comprises: obtaining at least one foundation VM instance that meets the hardware resource need; and installing application resources included in the sub-path to each foundation VM instance in the at least one foundation VM instance.

The configuration requirement may further include a desired hardware resource need, for example, may specify the computing power of CPU, the size of memory, network bandwidth and other parameters. Therefore, a foundation VM instance that meets the hardware need may be obtained first, and then application resources included in the sub-path are installed one by one on the foundation VM instance. Although the installation process here costs a certain amount of time, the installation at this point is not triggered by a customer request but is a step for preparing a VM instance in advance, so the time being consumed will not affect the customer's wait time. In this manner, a certain number of VM instances may be provided for future customer requests in the resource pool in advance, so the performance of the virtual environment may be enhanced.

In one embodiment of the present invention, the installing application resources included in the sub-path to each foundation VM instance in the at least one foundation VM instance comprises: installing application resources included in the sub-path one by one on the basis of the dependency relation. For example, the implementation may take an order of operating system, middleware, middleware configuration and application/database.

In one embodiment of the present invention, there is further comprised: obtaining process parameters associated with the installation of application resources included in the sub-path; and determining the number of the at least one VM instance on the basis of the process parameters.

Those skilled in the art may understand the user does not like waiting. When the installation time lasts only for 5 minutes, it is acceptable to the user; when the installation time last for 1 hour, however, it might be unacceptable to the user. Therefore, it may be determined, on the basis of process parameters associated with the installation process, how many VM instances will be provided in the resource pool. For example, regarding a VM instance that is installed for a long time, a larger number of VM instances may be provided; while regarding a VM instance that is installed for a short time, a less number of VM instances may be provided. At this point, even if the resource pool does not contain a VM instance being requested, the user does not mind waiting for 5 minutes.

Only one respect of the installation process has been illustrated above. Since the installation process might involve complicated operations, the process parameters may include various respects of contents. In one embodiment of the present invention, the process parameters comprise at least one of: the number of times that a virtual machine corresponding to a sub-path of the resource tree is requested, and the time for installing application resources included in the sub-path.

It should be understood in the user need history, if the user frequently requests a VM instance where some application resources are installed, then this type of VM instance might be requested again. Thus, regarding a VM instance that is requested for many times, a larger number of VM instances may be provided; while regarding a VM instance that is requested for fewer times, a less number of VM instances may be provided. Only two examples of the process parameters have been illustrated above. Those skilled in the art may further adopt other method on the basis of a concrete application environment. For example, if it is considered the installation process will occupy a large amount of computing resources in the virtual environment, then the amount of occupied computing resources may further act as one respect of the process parameters.

In one embodiment of the present invention, the amount of the at least one VM instance is proportional to the process parameters. Detailed description has been presented above to how to provide a corresponding amount of VM instances on the basis of the number of requests and the installation time. On the basis of the principle, those skilled in the art may define a concrete calculation equation as an application environment demands.

For example, the amount of VM instances may be calculated as a function of the number of requests in a past time period:

$$\text{Amount of VM instances} = \text{Number of requests}/a \qquad \text{Equation 1}$$

wherein a is a constant number, and those skilled in the art may adjust a value of a on the basis of status of the virtual environment.

For example, the number of VM instances may be calculated as a function of the installation time:

$$\text{Number of VM instances} = \text{Installation time}/b \quad \text{Equation 2}$$

wherein b is a constant number, and those skilled in the art may adjust a value of b on the basis of status of the virtual environment.

For another example, the number of VM instances may be calculated on the basis of both the number of requests and the installation time:

$$\text{Number of VM instances} = \text{Number of requests} \times \text{installation time}/c \quad \text{Equation 3}$$

wherein c is a constant number, and those skilled in the art may adjust a value of c on the basis of status of the virtual environment.

Or the number of VM instances may be calculated on the basis of Equations 1-3 or a combination of only one part thereof. For example, a maximum, a minimum or a mean of Equations 1-3 may be selected.

Figure 7:
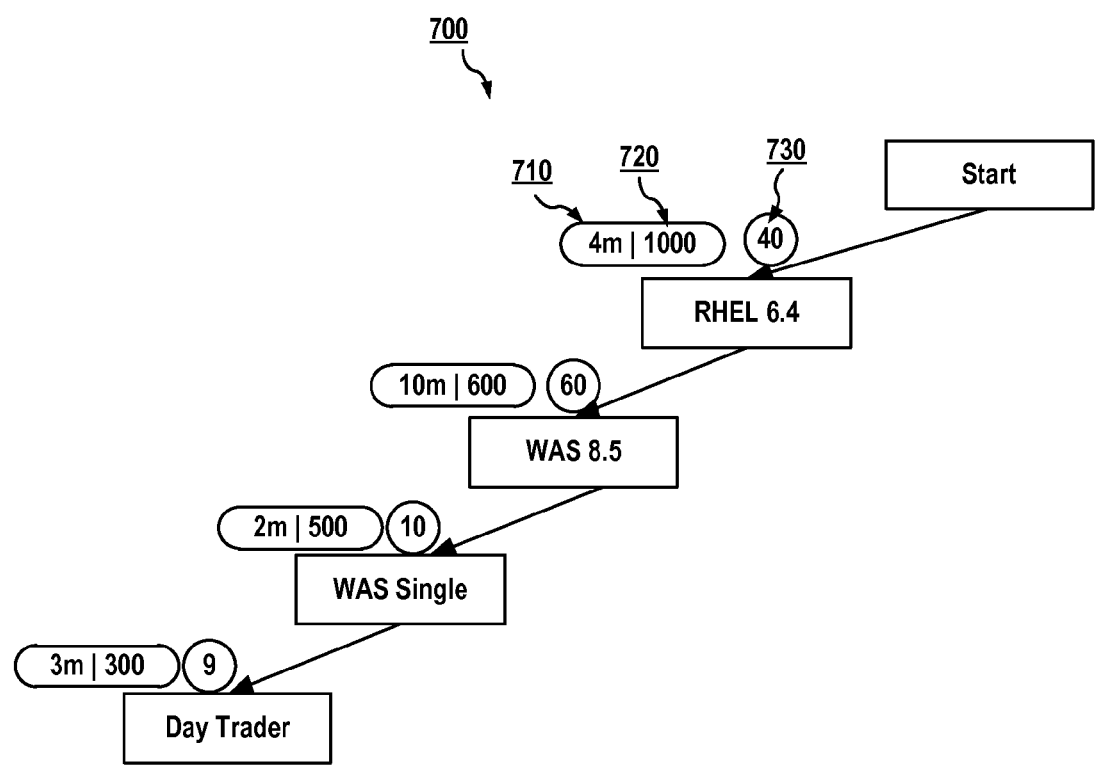
FIG. 7 schematically depicts a block diagram of a resource tree according to one embodiment of the present invention.

On the basis of the method described above, the number of times the VM instance corresponding to the sub-path in the resource tree is requested and the installation time may be collected, and it can be calculated how many VM instances should be provided in the resource pool. These data may be added to the resource tree, and by traversing the resource tree, responding VM instances can be provided. FIG. 7 schematically shows a block diagram 700 of a resource tree according to one embodiment of the present invention. As shown in this figure, an attribute (installation time, number of requests, amount) may be added to each node. As shown in FIG. 7, the value in an ellipse over each node represents a process parameter associated with the installation of an application resource represented by the node: a numeral 710 represents the installation time (4 minutes), and a numeral 720 represents the number of requests (1000 requests). The value in a circle above each node represents the number of to-be-provided VM instances which is calculated on the basis of the process parameter. Specifically, a numeral 730 represents the number of to-be-provided VM instances (40).

By traversing the resource tree as shown in FIG. 7, it may be clearly determined which types of VM instances need to be provided, and it may be determined how many VM instances need to be provided with respect to each type. For example, a node RHEL 6.4 represents 40 VM instances where RHEL 6.4 is installed need to be provided; a node DayTrader represents 9 VM instances where RHEL 6.4, WAS 8.5, WAS Single and DayTrader are installed need to be provided.

In one embodiment of the present invention, there is further comprised: parsing a second configuration requirement with respect to a second virtual machine, the second configuration requirement describing a second amount of application resources to be installed on the second virtual machine; building, on the basis of the second configuration requirement, a second resource tree that describes a dependency relation between the second amount of application resources; and combining the second resource tree with the resource tree according to a correspondence relation between the first amount of application resources and the second amount of application resources.

Since the need history may include many configuration requirements, each need may be parsed one by one or only one part of needs may be parsed, so as to obtain a plurality of resource trees. By combining the plurality of resource trees, the user's various needs with respect to VM instances may be extracted gradually, and these needs are recorded in a tree resulting from the combination.

Figure 8:
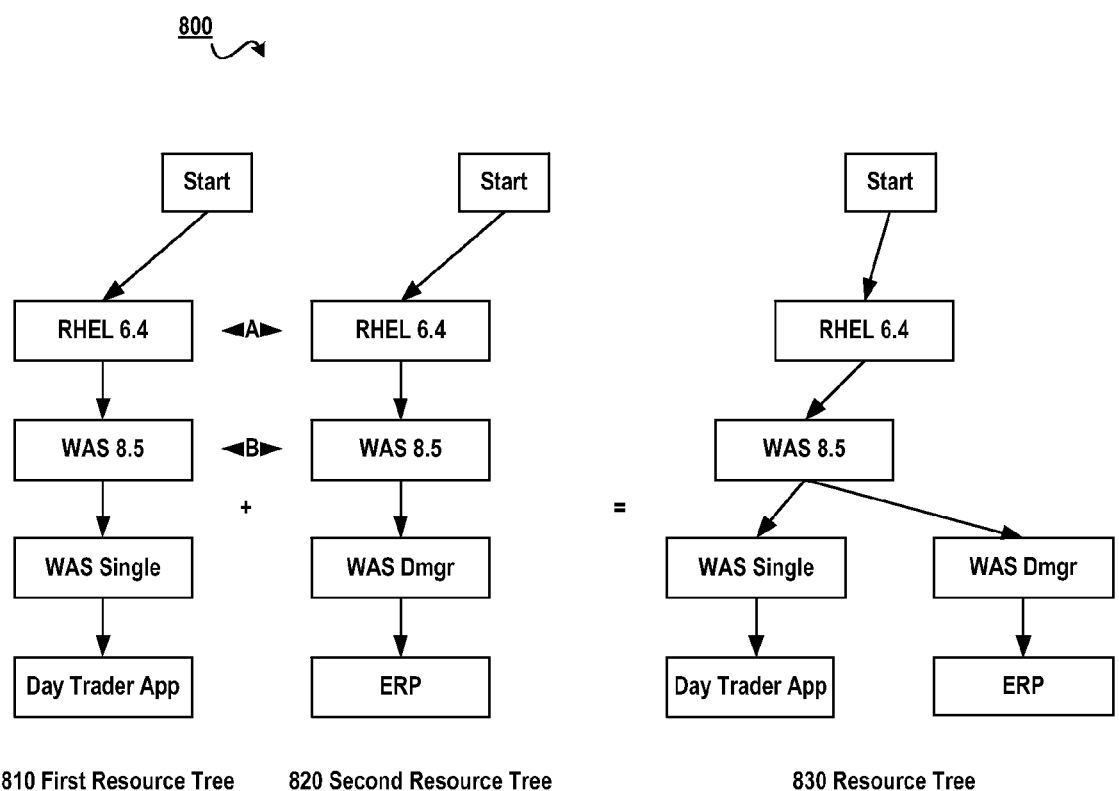
FIG. 8 schematically depicts a block diagram of combining two resource trees according to one embodiment of the present invention.

Specifically, FIG. 8 schematically shows a block diagram 800 of combining two resource trees according to one embodiment of the present invention. For example, a first resource tree 810 is built by parsing a first configuration requirement, and a second resource tree 820 is built by parsing a second configuration requirement. As shown by arrows A and B in FIG. 8, nodes "RHEL 6.4" in first resource tree 810 and in second resource tree 820 have a correspondence relation, and nodes "WAS 8.5" in first resource tree 810 and in second resource tree 820 have a correspondence relation, so nodes "RHEL 6.4" in the two trees may be combined and nodes "WAS 8.5" in the two trees may be combined, thereby obtaining a resource tree 830.

Figure 9:
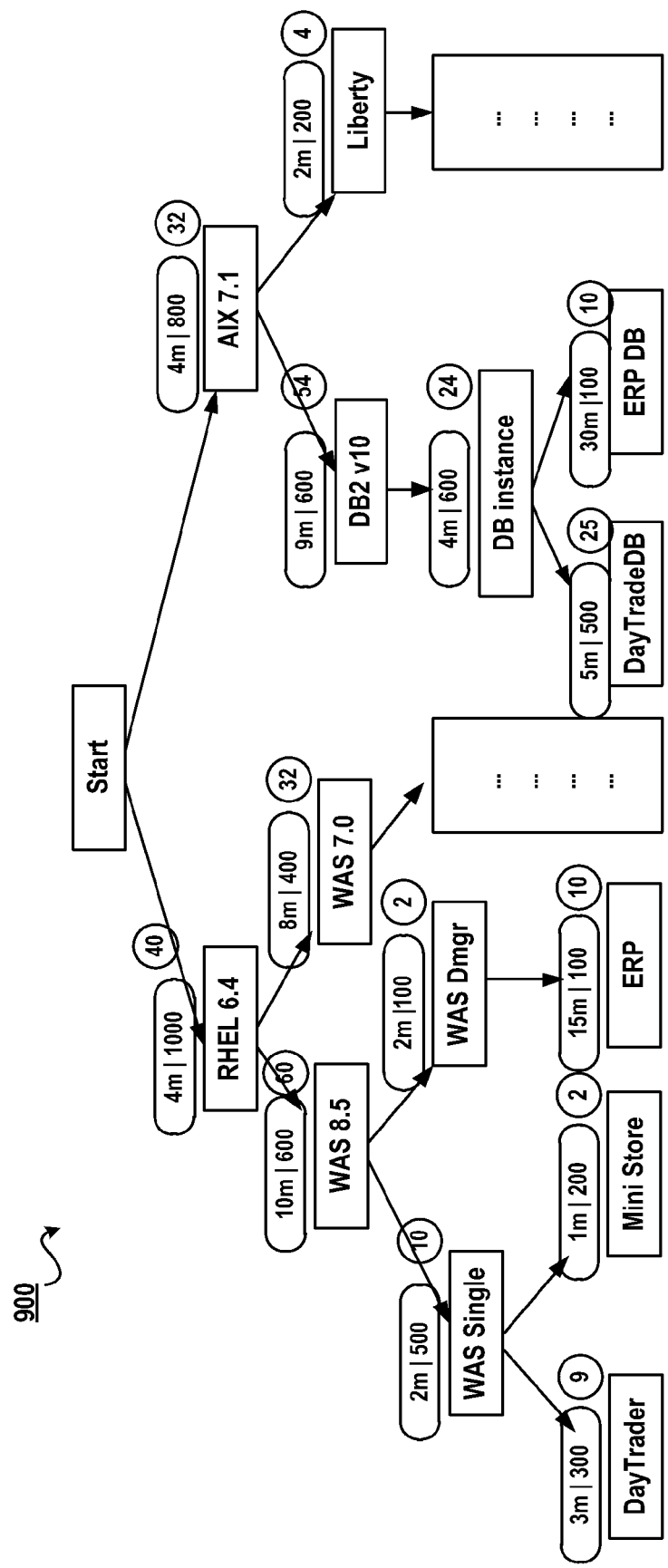
FIG. 9 schematically depicts a block diagram of a resource tree according to one embodiment of the present invention.

FIG. 8 merely illustrates an example of combining resource trees generated from two configuration requirements. When there are a plurality of configuration requirements, a plurality of resource trees from the plurality of configuration requirements are combined into a resource tree as shown in FIG. 9 by using the method described with reference to FIG. 8. FIG. 9 schematically shows a block diagram 900 of a resource tree according to one embodiment of the present invention. Like FIG. 7, in FIG. 9 the value in an ellipse over each node represents a process parameter associated with the installation of application resources represented by the node, and the value in a circle over each node represents the number of VM instances to be provided. By traversing the resource tree as shown in FIG. 9, VM instances corresponding to each sub-path of the resource tree may be provided. For example, 40 VM instances where RHEL 6.4 is installed may be provided; 32 VM instances where AIX 7.1 is installed may be provided, and 60 VM instances where RHEL 6.4 and WAS 8.5 are installed may be provided, etc.

In one embodiment of the present invention, the application resources at least comprise at least one of: an operating system, middleware, middleware configuration, a database system, and an application. Those skilled in the art may understand with the development of computer technology, there might be a growing variety of application resources. In the context of the present invention, examples of application resources are merely illustrated. According to the principle of the present invention, application resources may include various resources that are currently known or to be developed later.

In one embodiment of the present invention, the method of the present invention is executed periodically. For example, a configuration requirement from a user, the number of times the VM instance is requested, as well as the installation time may be monitored in real time, and the resource tree is updated in real time using these data, so as to manage the resource pool on the basis of the latest data.

In one embodiment of the present invention, there is provided a method for providing a VM instance, comprising: obtaining a configuration requirement with respect to a virtual machine as contained in a user need; and in response to the existence of a VM instance that satisfies the configuration requirement in a resource pool, providing the VM instance, wherein the resource pool is a resource pool according to a method described in the present invention.

On the basis of the foregoing principle, various types of VM instances may be provided in the resource pool. Thus, when later receiving a request from a customer, first it is looked up in the resource pool whether or not there exists a VM instance satisfying the configuration requirement; if yes, the VM instance satisfying the configuration requirement is provided directly.

In one embodiment of the present invention, there is further comprised: in response to no existence of a VM instance that satisfies the configuration requirement in the resource pool, searching in the resource pool for a VM instance that satisfies at least one part of the configuration requirement, installing to the VM instance application resources associated with other part of the configuration requirement, and providing the VM instance.

When in the resource pool there is no VM instance satisfying the configuration requirement, a VM instance that best approaches the configuration requirement may be found, and other application resources requested by the user are installed on the VM instance, whereby the requested VM instance is obtained rapidly.

Figure 6B:
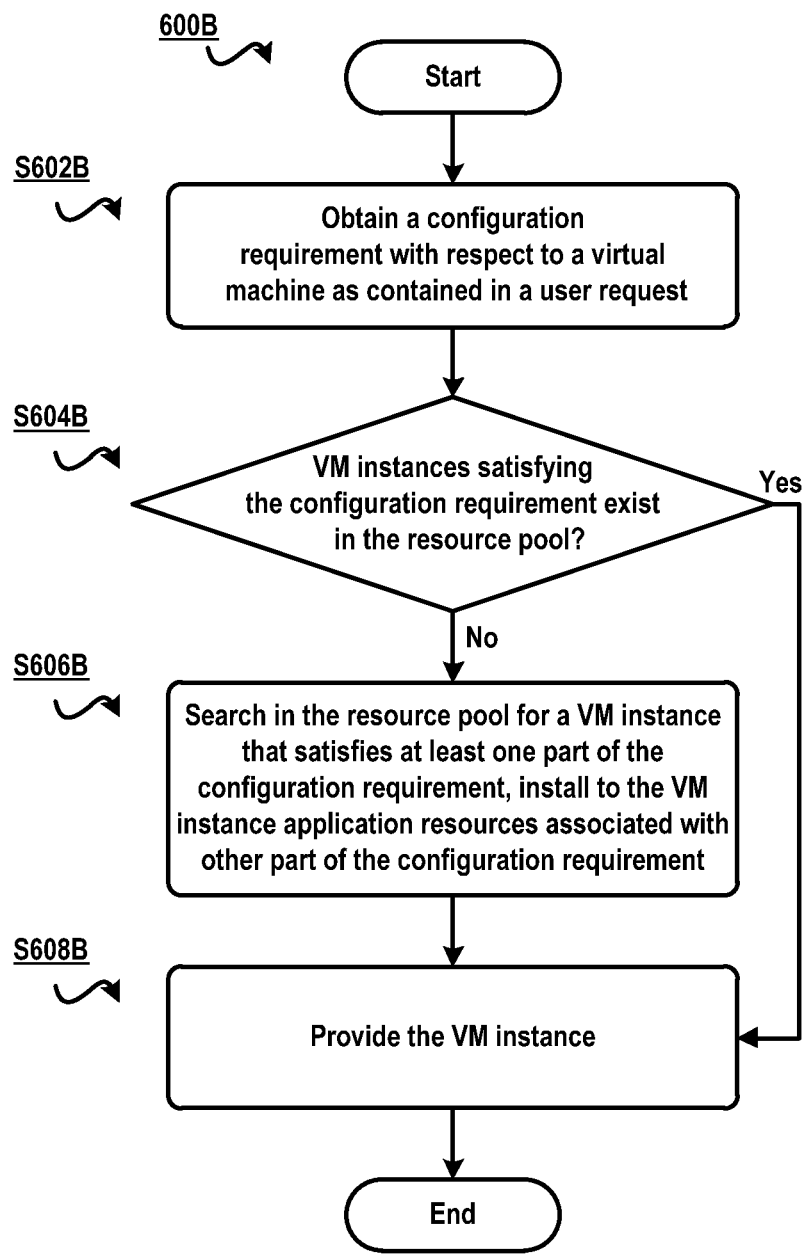

Now returning to FIG. 6B, this figure schematically shows a flowchart 600B of a method for providing a VM instance according to one embodiment of the present invention. In step S602B, a configuration requirement with respect to a virtual machine as contained in a user request is obtained. In step S604B, it is judged whether or not in the resource pool there is a VM instance satisfying the configuration requirement: if yes, the flow proceeds to step S608B, otherwise to step S606B. In step S606B, other needed application resources are installed to a VM instance satisfying one part of the configuration instance, and the VM instance is provided in step S608B.

Detailed illustration is presented now to details to step S606B by means of a concrete example. Returning to FIG. 7, suppose currently only VM instances associated with the resource tree as shown in FIG. 7 are provided in the resource pool. When the user requests a virtual machine where RHEL 6.4 and WAS 7.0 are installed, since the resource pool contains no VM instance satisfying this configuration requirement, the requested VM instance cannot be provided to the user directly. At this point, a VM instance where RHEL 6.4 is installed may be selected from the resource pool, and then WAS 7.0 is installed on this VM instance so as to satisfy the user need. Note since the installation time for WAS 7.0 lasts for only 8 minutes, compared with the existing technical solution for installing a plurality of application resources from the beginning, the technical solution of the present invention greatly shortens the wait time for users.

Various embodiments implementing the method of the present invention have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus based on the same invention concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention. The apparatus described in the present invention comprises several means or modules, the means or modules configured to execute corresponding steps. Upon reading this specification, those skilled in the art may understand how to write a program for implementing actions performed by these means or modules. Since the apparatus is based on the same invention concept as the method, the same or corresponding implementation details are also applicable to means or modules corresponding to the method. As detailed and complete description has been presented above, the apparatus is not detailed below.

Figure 10A:
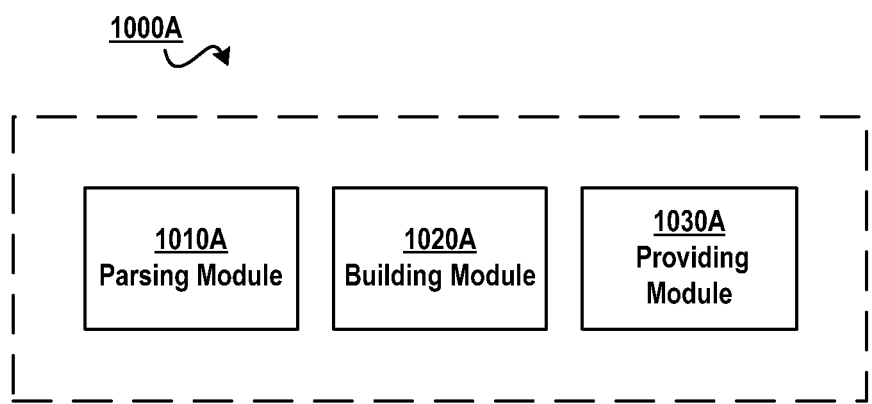
FIG. 10A schematically depicts a block diagram of an apparatus for providing at least one VM instance in a resource pool according to one embodiment of the present invention, and FIG. 10B schematically depicts a block diagram of an apparatus for providing a VM instance according to one embodiment of the present invention.

FIG. 10A schematically shows a block diagram 1000A of an apparatus for providing at least one VM instance in a resource pool, comprising: a parsing module 1010A configured to parse a configuration requirement with respect to a virtual machine, the configuration requirement describing a first amount of application resources to be installed on the virtual machine; a building module 1020A configured to build, on the basis of the configuration requirement, a resource tree describing a dependency relation between the first amount of application resources; a providing module 1030A configured to provide in the resource pool at least one VM instance corresponding to a sub-path of the resource tree, wherein on each VM instance in the at least one VM instance there are installed application resources included in the sub-path.

In one embodiment of the present invention, the configuration requirement further describes a hardware resource need of the virtual machine, and providing module 1030A comprises: a foundation obtaining module configured to obtain at least one foundation VM instance that meets the hardware resource need; and an installing module configured to install application resources included in the sub-path to each foundation VM instance in the at least one foundation VM instance.

In one embodiment of the present invention, the installing module comprises: a first installing module configured to install application resources included in the sub-path one by one on the basis of the dependency relation.

In one embodiment of the present invention, there are further comprised: a parameter obtaining module configured to obtain process parameters associated with the installation of application resources included in the sub-path; and a determining module configured to determine the number of the at least one VM instance on the basis of the process parameters.

In one embodiment of the present invention, the process parameters comprise at least one of: the number of times that a virtual machine corresponding to a sub-path of the resource tree is requested, and the time for installing application resources included in the sub-path.

In one embodiment of the present invention, the number of the at least one VM instance is proportional to the process parameters.

In one embodiment of the present invention, there are further comprised: a second parsing module configured to parse a second configuration requirement with respect to a second virtual machine, the second configuration requirement describing a second amount of application resources to be installed on the second virtual machine; a second building module configured to build, on the basis of the second configuration requirement, a second resource tree that describes a dependency relation between the second amount of application resources; and a combining module configured to combine the second resource tree with the resource tree according to a correspondence relation between the first amount of application resources and the second amount of application resources.

In one embodiment of the present invention, the application resources comprise at least one of: an operating system, middleware, middleware configuration, a database system, and an application.

Figure 10B:
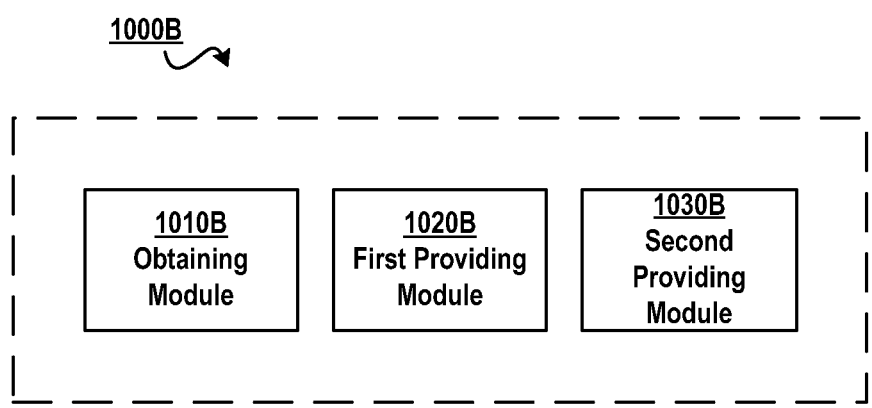

FIG. 10B schematically shows a block diagram 1000B of an apparatus for providing a VM instance according to one embodiment of the present invention. Specifically, there is provided an apparatus for providing a VM instance, comprising: an obtaining module 1010B configured to obtain a configuration requirement with respect to a virtual machine as contained in a user request; and a first providing module 1020B configured to, in response to the existence of a VM instance that satisfies the configuration requirement in a resource pool, provide the VM instance, wherein the resource pool is a resource pool according to a method described in the present invention.

In one embodiment of the present invention, there is further comprised: a second providing module 1030B configured to, in response to no existence of a VM instance that satisfies the configuration requirement in the resource pool, search in the resource pool for a VM instance that satisfies at least one part of the configuration requirement, install to the VM instance application resources associated with other part of the configuration requirement, and provide the VM instance.

By means of the methods and apparatuses of the present invention, a certain number of VM instances may be provided in the resource pool in advance, and a desired VM instance may be provided directly or by a simple installation process when receiving a user request.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method, in a data processing system comprising a processor and a memory coupled to the processor, for providing at least one virtual machine instance in a resource pool, comprising:
    parsing, by the processor, a configuration requirement with respect to a requested virtual machine, the configuration requirement describing a plurality of application resources to be installed on the requested virtual machine;
    building, by the processor, on the basis of the configuration requirement, a resource tree describing a dependency relation between each of the plurality of application resources for the requested virtual machine; and
    providing, by the processor, in the resource pool a virtual machine instance corresponding to each of the plurality of application resources in the configuration requirement with respect to the requested virtual machine and at least one additional virtual machine instance that comprises at least one application resource less than the plurality of application resources described in the resource tree, wherein each at least one additional virtual machine instance forms a sub-path of the resource tree and wherein on each additional virtual machine instance in the at least one additional virtual machine instance there are installed application resources included in the sub-path.

2. The method according to claim 1, wherein the configuration requirement further describes a hardware resource need of the virtual machine, and the providing in the resource pool the at least one additional virtual machine instance corresponding to the sub-path of the resource tree comprises:
    obtaining, by the processor, at least one foundation virtual machine instance that meets the hardware resource need; and
    installing, by the processor, application resources included in the sub-path to each foundation virtual machine instance in the at least one foundation virtual machine instance.

3. The method according to claim 2, wherein the installing application resources included in the sub-path to each foundation virtual machine instance in the at least one foundation virtual machine instance comprises:
    installing, by the processor, application resources included in the sub-path one by one on the basis of the dependency relation.

4. The method according to claim 1, further comprising:
    obtaining, by the processor, process parameters associated with the installation of application resources included in the sub-path; and
    determining, by the processor, a number of the at least one additional virtual machine instances to install on the basis of the process parameters.

5. The method according to claim 4, wherein the process parameters comprise at least one of: a number of times that a virtual machine corresponding to a sub-path of the resource tree is requested, or a time for installing application resources included in the sub-path.

6. The method according to claim 5, wherein the number of the at least additional one virtual machine instance is proportional to the process parameters.

7. The method according to claim 1, further comprising:
    parsing, by the processor, a second configuration requirement with respect to a requested second virtual machine, the second configuration requirement describing a plurality of application resources to he installed on the second requested virtual machine;
    building, by the processor, on the basis of the second configuration requirement, a second resource tree that describes a dependency relation between each of the plurality of application resources for the second requested virtual machine; and
    combining, by the processor, the second resource tree with the resource tree according to a correspondence relation between the plurality of application resources for the requested virtual machine and the plurality of application resources for the second requested virtual machine.

8. The method according to claim 1, further comprising:
    parsing, by the processor, a second configuration requirement with respect to a requested second virtual machine, the second configuration requirement describing a plurality of application resources to be installed on the second requested virtual machine;
    determining, by the processor, whether one of the at least one additional virtual machines instances meets the second configuration requirement; and
    responsive to one of the at least one additional virtual machines instances meeting at least a portion of the second configuration requirement, utilizing the additional virtual machine instance that meets the at least portion of the second configuration requirement as the second requested virtual machine.

9. An apparatus for providing at least one virtual machine instance in a resource pool, comprising:
    a processor; and
    a memory coupled to the processor, wherein the memory comprises instructions which, when executed by the processor, cause the processor to:
    parse a configuration requirement with respect to a requested virtual machine, the configuration requirement describing a plurality of application resources to be installed on the requested virtual machine;

build, on the basis of the configuration requirement, a resource tree describing a dependency relation between each of the plurality of application resources for the requested virtual machine; and provide in the resource pool a virtual machine instance corresponding to each of the plurality of application resources in the configuration requirement with respect to the requested virtual machine and at least one additional virtual machine instance that comprises at least one application resource less than the plurality of application resources described in the resource tree, wherein each at least one additional virtual machine instance forms a sub-path of the resource tree and wherein on each additional virtual machine instance in the at least one additional virtual machine instance there are installed application resources included in the sub-path.

10. The apparatus according to claim 9, wherein the configuration requirement further describes a hardware resource need of the virtual machine, and wherein the instructions to provide in the resource pool the at least one additional virtual machine instance corresponding to the sub-path of the resource tree further cause the processor to:
obtain at least one foundation virtual machine that meets the hardware resource need; and
install application resources included in the sub-path to each foundation virtual machine instance in the at least one foundation virtual machine instance.

11. The apparatus according to claim 10, wherein the instructions further cause the processor to:
install application resources included in the sub-path one by one on the basis of the dependency relation.

12. The apparatus according to claim 9, wherein the instructions further cause the processor to:
obtain process parameters associated with the installation of application resources included in the sub-path; and
determine a number of the at least one additional virtual machine instances to install on the basis of the process parameters.

13. The apparatus according to claim 12, wherein the process parameters comprise at least one of: a number of times that a virtual machine corresponding to a sub-path of the resource tree is requested, or a time for installing application resources included in the sub-path.

14. The apparatus according to claim 13, wherein the number of the at least one additional virtual machine instance is proportional to the process parameters.

15. The apparatus according to claim 9, wherein the instructions further cause the processor to:
parse a second configuration requirement with respect to a requested second virtual machine, the second configuration requirement describing a plurality of application resources to be installed on the second requested virtual machine;
build, on the basis of the second configuration requirement, a second resource tree that describes a dependency relation between each of the plurality of application resources for the second requested virtual machine; and
combine the second resource tree with the resource tree according to a correspondence relation between the plurality of application resources for the requested virtual machine and the plurality of application resources for the second requested virtual machine.

16. The apparatus according to claim 9, wherein the instructions further cause the processor to:
parse a second configuration requirement with respect to a requested second virtual machine, the second configuration requirement describing a plurality of application resources to be installed on the second requested virtual machine;
determine whether one of the at least one additional virtual machines instances meets the second configuration requirement; and
responsive to one of the at least one additional virtual machines instances meeting at least a portion of the second configuration requirement, utilize the additional virtual machine instance that meets the at least portion of the second configuration requirement as the second requested virtual machine.

17. A computer program product comprising a computer readable storage medium having a computer readable program for providing at least one virtual machine instance in a resource pool stored therein, wherein the computer readable program, when executed on a computing device, causes the computing device to:
parse a configuration requirement with respect to a requested virtual machine, the configuration requirement describing a plurality of application resources to be installed on the requested virtual machine;
build, on the basis of the configuration requirement, a resource tree describing a dependency relation between each of the plurality of application resources for the requested virtual machine; and
provide in the resource pool a virtual machine instance corresponding to each of the plurality of application resources in the configuration requirement with respect to the requested virtual machine and at least one additional virtual machine instance that comprises at least one application resource less than the plurality of application resources described in the resource tree, wherein each at least one additional virtual machine instance forms a sub-path of the resource tree and wherein on each additional virtual machine instance in the at least one additional virtual machine instance there are installed application resources included in the sub-path.

18. The computer program product according to claim 17, wherein the configuration requirement further describes a hardware resource need of the virtual machine, and wherein the computer readable program to provide in the resource pool the at least one additional virtual machine instance corresponding to the sub-path of the resource tree further causes the computing device to:
obtain at least one foundation virtual machine instance that meets the hardware resource need; and
install application resources included in the sub-path to each foundation virtual machine instance in the at least one foundation virtual machine instance.

19. The computer program product according to claim 17, wherein the computer readable program further causes the computing device to:
obtain process parameters associated with the installation of application resources included in the sub-path; and
determine a number of the at least one additional virtual machine instances to install on the basis of the process parameters.

20. The computer program product according to claim 17, wherein the computer readable program further causes the computing device to:

parse a second configuration requirement with respect to a requested second virtual machine, the second configuration requirement describing a plurality of application resources to be installed on the second requested virtual machine;

build, on the basis of the second configuration requirement, a second resource tree that describes a dependency relation between each of the plurality of application resources for the second requested virtual machine; and combine the second resource tree with the resource tree according to a correspondence relation between the plurality of application resources for the requested virtual machine and the plurality of application resources for the second requested virtual machine.

\* \* \* \* \*